United States Patent [19] [11] 4,271,380
Bradler et al. [45] Jun. 2, 1981

[54] ELECTRIC TWO-MOTOR DRIVE

[75] Inventors: Peter Bradler, Lengfeld; Jaroslav Stepina, Kaiserslautern, both of Fed. Rep. of Germany

[73] Assignee: Siemens Aktiengesellschaft, Berlin & Munich, Fed. Rep. of Germany

[21] Appl. No.: 946,862

[22] Filed: Sep. 29, 1978

[30] Foreign Application Priority Data
Sep. 30, 1977 [DE] Fed. Rep. of Germany ....... 2774422

[51] Int. Cl.³ ............................................. H02K 23/64
[52] U.S. Cl. .................................... 318/245; 310/133; 310/134; 318/244; 318/738; 318/34
[58] Field of Search .............. 310/112, 184, 126, 198, 310/254, 261, 264, 114, 206, 234, 133, 134, 173, 193; 318/34, 49, 50, 51, 94, 113, 112, 738, 244, 245

[56] References Cited
U.S. PATENT DOCUMENTS
1,742,112  12/1929  Welsch ................................. 310/198
3,250,976  5/1966  McEntire ......................... 310/261 X FOREIGN PATENT DOCUMENTS
2530294  1/1977  Fed. Rep. of Germany .

Primary Examiner—Ulysses Weldon
Attorney, Agent, or Firm—Kenyon & Kenyon

[57] ABSTRACT

An induction and universal (commutator) motor combination which share a common lamination core and are supplied by a single-phase line. The stator and rotor are provided with multiple poles and phase windings. A winding system for at least one rotor phase winding is common to commutator motor as well as induction motor operation. A lap winding is connected to a commutator, said lap winding having a coil span corresponding approximately to a single pole pitch of the commutator motor stator winding and corresponding as well to an uneven integral multiple of the coil span of the multi-pole induction motor stator winding. The invention finds particular application in regard to drives for automatic washing machines.

6 Claims, 8 Drawing Figures

ELECTRIC TWO-MOTOR DRIVE

BACKGROUND OF THE INVENTION

The invention relates to an electric two-motor drive, each motor of which being connected to a single-phase a-c line which serves as the sole supply source.

There is provided a stator winding, arranged on a common stator lamination core, of a commutator motor having a relatively small number of poles and of an induction motor having a relatively large number of poles. There is provided a common armature which is wound in such a manner that the coils in each phase winding can form short circuits corresponding to the number of poles in the exciting induction motor stator field and that the coils, when functionally connected to input brushes via a commutator, can form circuits having a number of poles corresponding to the number of poles in the commutator stator fields.

DESCRIPTION OF PRIOR ART

In one known two-motor drive of this type (German Offenlegungsschrift No. 25 30 294), the stator lamination core has slots distributed over the entire circumference. The 12-pole, 3-phase stator winding of the induction motor and the windings of the 2-pole commutator motor, functioning as an a-c series motor, are arranged in common slots, with stator laminations being cut with unequal slot cross sections and with the windings of the induction motor being distributed uniformly in all slots. The windings of the series motor are carried by only some of the slots, which slots must therefore have a larger slot cross section than the other slots which carry the winding of the induction motor alone. The rotor carries a 2-pole armature winding connected to the commutator segments of a series motor and also carries an induction motor winding, which is completely separated and is wound having 2 phase windings and with a number of poles corresponding to the induction motor winding of the stator. The coils or groups of coils of the induction motor winding are connected in series, and form short circuits with one end of the winding being connected to the other.

In another known two-motor drive which is shown in Swiss Patent No. 17 611, there is disclosed a d-c motor and an a-c motor having an induction motor winding connected to the commutator and having a d-c wave winding. This drive system, which is used primarily as a rotary converter, is always operated simultaneously with both a-c and d-c current.

SUMMARY OF THE INVENTION

It is an object of the present invention to provide an electric two-motor drive arrangement which makes possible a more effective and efficient utilization of the winding copper used in the rotor with this utilization being simple and effective in terms of production efficiency and winding technique.

According to the teachings of this invention, there is provided an electric two-motor drive wherein the stator and the rotor windings are established having multiple poles and phase windings. A lap winding is connected to a commutator in order to establish a winding system which, at least in regard to a single rotor phase winding, will be functionally operable in commutator as well as induction motor operation. The coil span of this lap winding corresponds approximately to one pole pitch of the low pole, i.e. the 2-pole, commutator stator winding and corresponds to an uneven integral multiple of the multi-pole induction motor stator winding. One thereby obtains the result that, by virtue of simple design of the rotor winding as well as of the commutator, the copper of the winding of the one rotor phase winding used for commutator as well as induction motor operation is fully utilized in each of the two modes of operation (commutator and induction motor, respectively) of the two-motor drive, without the use of any switching. By arranging the rotor winding in a particular manner as taught by this invention, one obtains the result that, on the one hand, all phase windings respond to the multi-pole stator field of the induction motor as multi-phase windings formed by short circuited phase windings, and, on the other hand, if current flows through the brushes of the commutator and the stator winding of the commutator motor is thereby energized, the phase winding functions in conjunction with the 2-pole field as a normal commutator lap winding. This functioning as a normal commutator lap winding takes place without the occurrence of oversynchronous braking torques at speeds above the synchronous speed of the multi-pole induction motor caused by the rotor phase windings, since the voltages formed in low (e.g. 2) pole operation by the low-pole field in the above-described "multi-pole shorted circuits" add up to zero.

A particularly advantageous application of the two-motor drive constructed in accordance with the invention would be in automatic washing machine drives, in which the induction motor would be functional for the washing cycle and the commutator motor, as a series universal motor, for the spinning cycle. Due to the specific design and stress conditions during the spinning operation, i.e., during the universal motor operation, not all the copper of the rotor need be used.

The induction motor or the commutator motor of the two-motor drive according to the invention can be made predominant: there can be provided, according to further embodiments of the invention, at least one additional rotor phase winding which would be arranged in a known manner as an induction motor winding isolated from the commutator winding and the commutator. The coils or groups of coils of this winding are connected in series in each phase winding and the beginning of the series circuit is connected directly to its end. There can also be provided a two-loop lap winding arrangement connected to a commutator providing a common winding system for at least two rotor phase windings. There is also disclosed an electric two-motor drive which possesses advantages vis-a-vis the two-loop lap winding, particularly in regard to the problems of circulating currents and uneven segment voltages. This latter drive is arranged so as to provide a common winding system for at least two rotor phase windings: there are provided two commutators, each of the communtators having connected thereto a single loop lap winding with the brush systems for the two commutators being connected in series.

Further features and advantages will be set forth in connection with the following detailed description.

DETAILED DESCRIPTION

Figure 1:
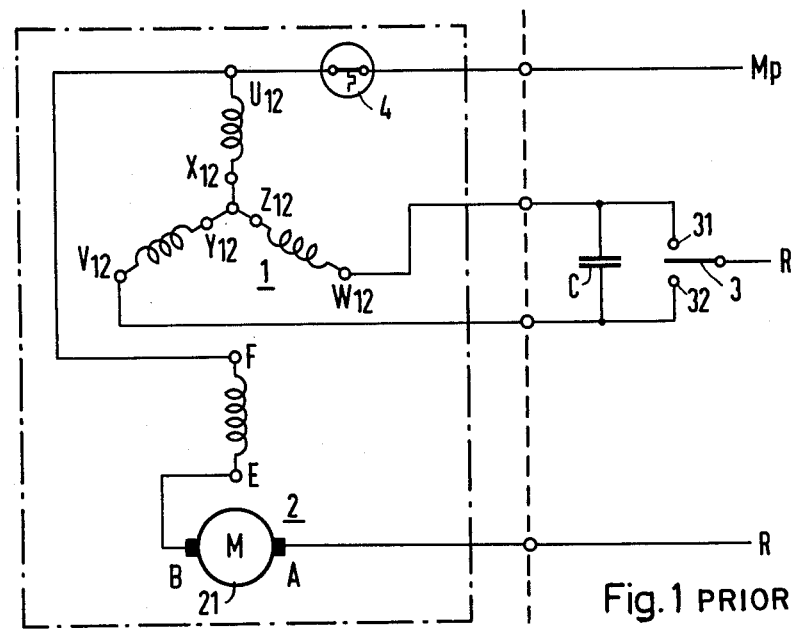
FIG. 1 shows the basic prior art circuit for an automatic washing machine drive having a three-phase induction motor and a universal motor (commutator) arranged on the same lamination core.

FIG. 1 shows in a dashed-dotted frame the integrated induction and universal motor to which electrical power is supplied via a single-phase line R, $M_p$. The three phase windings of the Y or star connected stator winding are shown at U12-X12, V12-Y12, and W12-Z12. The field winding of the series universal motor 2 is shown at EF and is supplied via single-phase a-c line R,$M_p$; the brushes of associated rotor 21 are at BA. FIG. 1 shows reversing switch 3 having contacts 31 and 32 connected in parallel to inputs V12 and W12; as is seen in the figure, switch 3 is also connected to terminal R of the supplying single phase line R,$M_p$ and capacitor C is shunted across the reversing switch terminals 31, 32. Thermal monitor 4 is connected between the second terminal $M_p$ of the single-phase supply line R,$M_p$ and the input terminal U12 of the induction motor. The induction motor which can, for example, be used to drive the washing drum of an automatic washing machine, could be provided with 12 poles and with the utilization of a reduction belt drive would be able to rotate the drum of the washing machine at approximately 50 RPM's. The induction motor can also be provided with only two phase windings instead of the three phase windings shown in FIG. 1. According to a preferred embodiment the universal motor has two poles, although a different number of poles could be selected.

The number of poles of the universal motor should, however, differ from the number of poles of the induction motor since, by virtue of this difference, one obtains, without additional switching and interrupting means in the current supply to the induction motor, no overall oversynchronous braking torque of the induction motor when the commutator series motor is operated at a speed above the synchronous speed of the induction motor.

Figure 2:
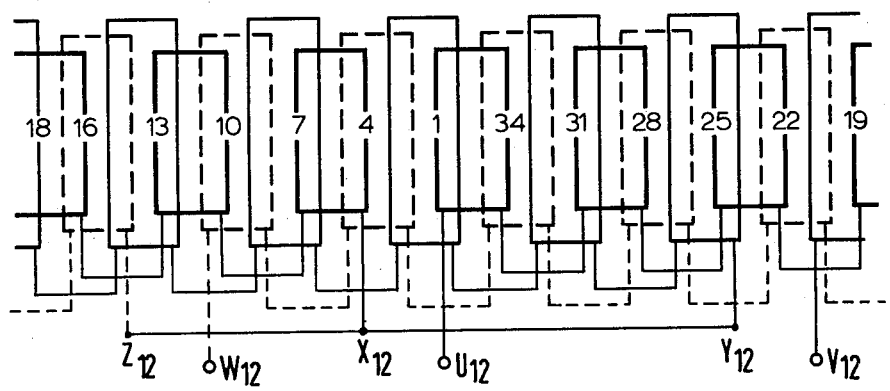
FIG. 2 shows a prior art winding diagram for the stator winding of a 12-pole, 3-phase winding induction motor and a 2-pole universal (commutator) motor arranged on the same stator lamination core.
Figure 2:
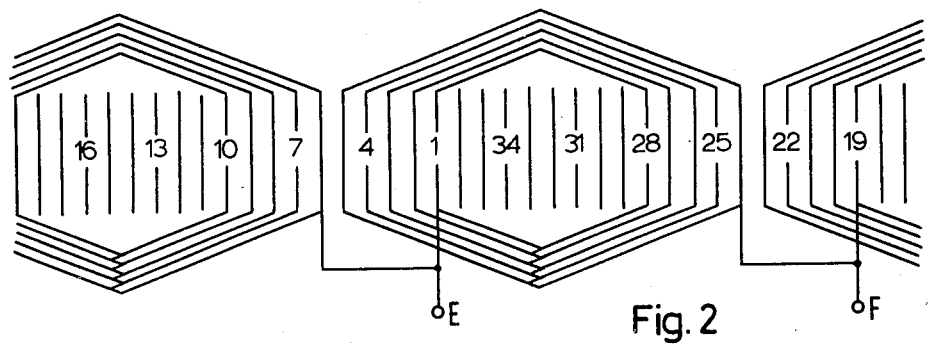

The upper portion of FIG. 2 depicts the winding plan of the prior art induction stator winding, generally shown in FIG. 1. The upper portion of FIG. 2 shows the core of a 12-pole, 3-phase winding induction motor 1 while the lower portion of FIG. 2 shows the winding plan of the stator of the 2-pole universal motor arranged on the same lamination core; the winding as shown in FIG. 2 consisting of these two winding configurations would be appropriate for the stator of a motor constructed according to the teachings of this invention.

Figure 3:
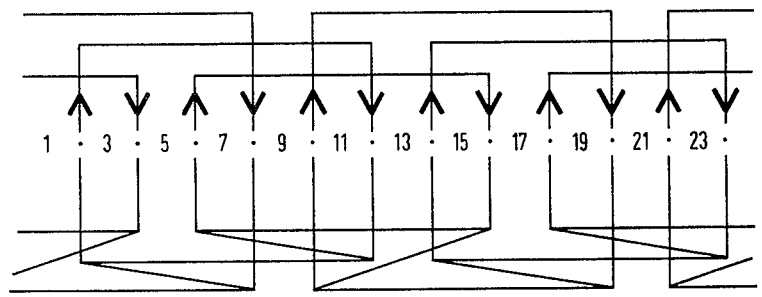
FIG. 3 shows a first phase winding of a partially integrated rotor winding which is used only for induction motor operation and which has no connection to the commutator.
Figure 4:
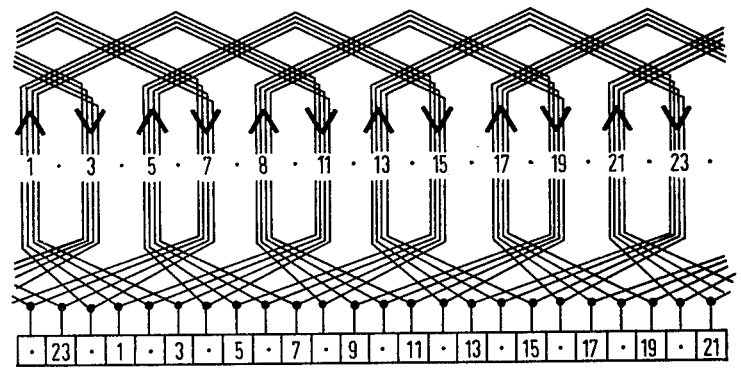
FIGS. 4 and 5 show a second phase winding which is connected to a commutator and is functional during both induction motor operation as well as during commutator motor operation, FIG. 4 depicting the winding when used for induction motor operation and FIG. 5 depicting the winding during universal motor operation with power supplied via brushes and commutator.
Figure 5:
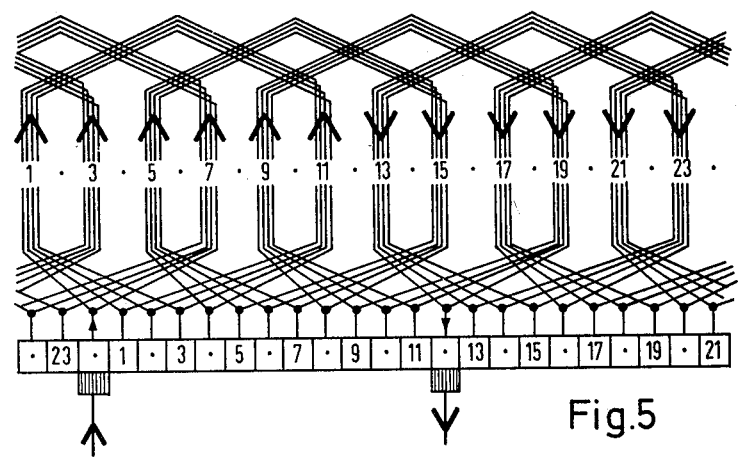

FIG. 3 shows a first phase winding, which is not connected to the commutator, of a rotor winding having 2 phase windings which function in induction motor operation; the second phase winding of this rotor winding is shown in FIG. 4 with the brushes carrying no current for induction motor operation while FIG. 5 shows the brushes carrying current for low-pole (i.e. 2 pole) commutator operation. As seen in these Figures the rotor has 24 rotor slots with the commutator being provided with 24 segments to which are connected the winding as per FIGS. 4 and 5 in accordance with the teachings of the invention.

FIG. 3 shows the first phase winding which constitutes a 12-pole short-circuit winding having a coil span of $5\tau_p$, this arrangement being functional only in induction motor operation. The current arrows shown indicate 12-pole rotor excitation.

FIG. 4 shows a second phase winding having the same coil span as the first phase winding shown in FIG. 3 with the coils in FIG. 4 being subdivided into subcoils and connected to a 24 segment commutator. This phase winding will be functional in induction motor operation as the normal short circuited rotor winding which will be energized by the 12 pole induction motor stator winding. The arrows shown in FIG. 4 indicate the direction of current induced in the winding during normal induction motor operation. It will be noted that, although the winding is connected to commutator segments (1, 3, . . . 23), this does not effect the winding operation as the input brushes normally connected to the commutator segments carry no current in FIG. 4, and, accordingly, the winding will, as mentioned, function as a normal induction motor secondary or rotor winding excited by the 12 pole induction motor primary or stator. Since, as mentioned, the brushes which are associated with the commutator of FIG. 4 do not function in the induction motor operation depicted in FIG. 4, these brushes are not shown in the figure.

FIG. 5 shows the same phase winding as FIG. 4 with FIG. 5 depicting the situation when the winding is energized via the brushes indicated in the figure and functioning as the rotor winding in a 2-pole universal motor. Again, the arrows superimposed on the windings show the direction of current flow during normal 2-pole universal motor operation.

Figure 6:
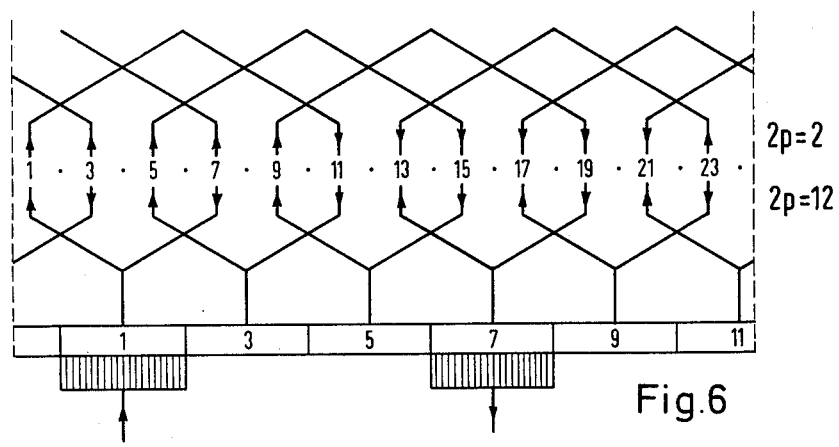
FIG. 6 depicts the winding scheme of a fully integrated phase winding which is functional in both low pole (e.g. 2 pole) commutator operation as well as high pole (e.g. 12 pole) induction operation.

FIG. 6 depicts a fully integrated phase winding for a 2 or 12 pole selectable drive motor having 24 slots (only 5 commutator segments are shown for ease of understanding). The winding shown in FIG. 6 will function as either a 2-pole commutator winding, which is closed upon itself, in normal fashion, or as a short-circuited 12 pole multiphase induction motor winding. In FIG. 6 the arrows indicate the two possible current flows in the winding, the upper arrows indicate current flow in two pole universal motor operation with the winding energized via the commutator and the lower arrows indicate current flow in 12 pole induction motor operation. This depicted winding is able to function in commutator motor operation or in induction motor operation by virtue of proper choice of slot number and coil span. The coil span is shorter than the pole pitch of the 2-pole system by a factor of approximately 1/6.

Although FIG. 6 shows but a single short circuited phase winding for induction motor operation, for optimum functioning, at least two such short circuited independent windings should be utilized.

Figure 7:
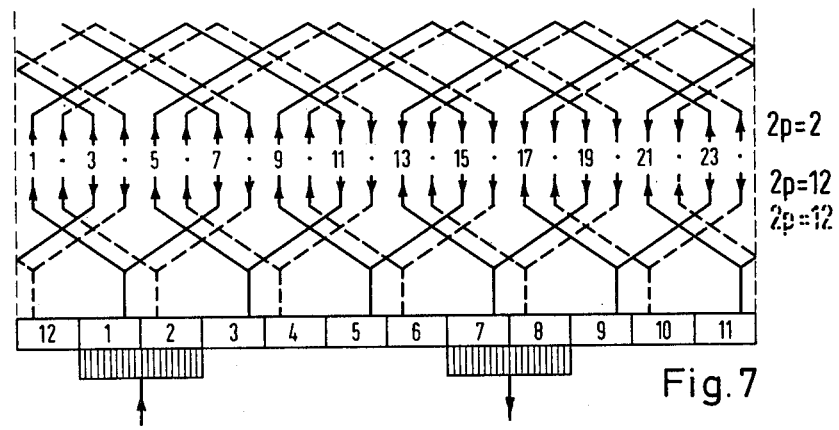
FIG. 7 depicts the winding plan shown in FIG. 6 with an additional fully integrated phase winding for induction motor operation, which arrangement utilizes only one commutator.

One possible manner of combining two phase winding in a fully integrated rotor winding is shown in FIG. 7. Two windings such as seen in FIG. 6 are located jointly on the rotor in order to show the fully integrated winding part and are alternately connected to the 12 commutator segments of the commutator as shown. A rotor provided with such a winding can function either as a 2-pole commutator armature with 4 parallel winding branches or as a 12-pole short-circuited induction rotor having 2 winding phases. This armature would be fully functional in commutator as well as in induction motor operation even without an additional isolated phase winding not connected to the commutator.

Figure 8:
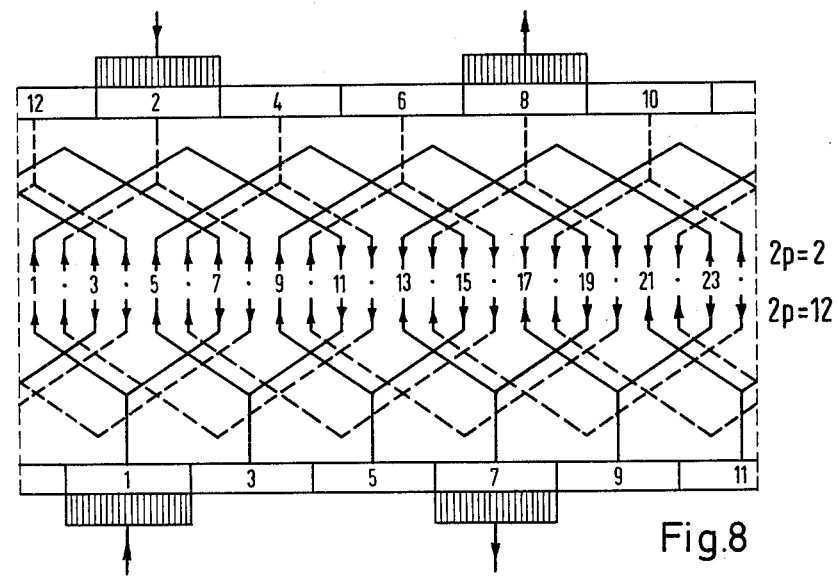
FIG. 8 depicts a fully integrated rotor winding with two phase windings for induction motor operation, which arrangement utilizes two commutators.

FIG. 8 also shows two fully integrated phase windings which are connected to two different commutators (segments 1, 3, 5, 7, 9, 11 and 2, 4, 6, 8, 10, 12 respectively). As in FIG. 7, one phase winding is shown with solid lines and the second phase winding with dashed lines. In the two commutator winding plans shown in FIG. 8, the brush systems are connected in series and only two parallel branches are provided in the armature. In the embodiments of the windings shown in FIGS. 6 to 8, as in the embodiments of FIGS. 3, 4 and 5, the coil span of the winding is such as to correspond to an uneven multiple of a conventional asynchronous-motor winding. In regard to the partially integrated rotor winding as shown in FIGS. 3 to 5, it has been noted that the costs for the fabrication of the winding as well as for the commutator can be kept relatively low.

The coil span for the non-integrated phase winding shown in FIG. 3 can be set at $5\tau_p$ of the high pole machine. In this case, this winding can be located, similar to a 2-pole universal motor winding, as a diametral winding, into the slots by machine means, for example, by means of a so-called flyer. However, to obtain particularly short winding lengths, a pole pitch can be chosen which deviates upward or downward and so long as it meets the requirement as corresponding to an uneven multiple of the pole pitch of the multi-pole winding.

The basic principle is that, for the integrated winding, on the one hand, the coil span is to correspond to an uneven multiple of the multi-pole "asynchronous" winding and on the other hand, this span is to correspond as nearly as possible to the pole pitch ($1\tau_p$) of the low-pole (i.e. 2-pole) commutator motor winding in order to obtain a good winding factor.

Regarding the displacement in space of the series-connected coils of a phase winding and the phase windings relative to each other, the following applies for the integrated rotor windings:

The series-connected coils are spatially displaced relative to each other by an even multiple of the pole pitch of "asynchronous" machine operation. The winding consists of m parts which are closed on themselves and are displaced at the rotor circumference by the spatial angle $2\pi/2p_A M$ ($p_A$=number of pole pairs of the "asynchronous" machine operation).

What is claimed is:

1. A motor drive adapted to function selectably as a commutator motor having a first predetermined number of poles comprising,
   (a) a stator core including
      (i) first stator winding means for producing the first predetermined number of poles for commutator motor functioning and having a first pole pitch, and
      (ii) second stator winding means for producing the second predetermined number of poles for induction motor functioning, and having a second pole pitch;
   (b) a rotor core including
      first rotor phase winding means for selectably responding to the first predetermined number of poles during commutator motor operation and to the second predetermined number of poles during induction motor operation; and
   (c) first commutator means connected to said first rotor phase winding means for receiving electric power during commutator motor functioning.

2. The motor drive according to claim 1 wherein there is further provided a second rotor phase winding means isolated from said first commutator means.

3. The motor drive according to claim 1 wherein there is further provided third rotor phase winding means for alternately responding to the first predetermined number of poles during commutator motor functioning and to the second predetermined number of poles during induction motor functioning, said third rotor phase winding means having a coil span corresponding to a coil span of said first rotor phase winding means.

4. The motor drive according to claim 3 wherein said third rotor phase winding is connected to said first commutator means.

5. The motor drive according to claim 4 wherein said first commutator means includes a plurality of adjacent commutator segments, said first and third phase winding means being connected to respective alternate ones of said adjacent commutator segments.

6. The motor drive according to claim 3 wherein there is further provided
   second commutator means, said third rotor phase winding means being connected to said second commutator means,
   first brush means connected to said first commutator means, and
   second brush means connected to said second commutator means and connected in series with said first brush means.

* * * * *